July 19, 1955  O. H. KLAUSMEYER  2,713,397
TEST CELL

Filed April 3, 1953  4 Sheets-Sheet 1

INVENTOR.
Otto H. Klausmeyer
BY
Browne, Jackson, Boettcher & Dienner
ATTORNEYS.

July 19, 1955 O. H. KLAUSMEYER 2,713,397
TEST CELL

Filed April 3, 1953 4 Sheets-Sheet 2

INVENTOR.
Otto H. Klausmeyer
BY
Brown, Jackson, Boettcher & Dienner
ATTORNEYS

July 19, 1955 — O. H. KLAUSMEYER — 2,713,397
TEST CELL

Filed April 3, 1953 — 4 Sheets-Sheet 3

INVENTOR.
Otto H. Klausmeyer
BY
Mann, Jackson, Boettcher & Surica
ATTORNEYS.

July 19, 1955  O. H. KLAUSMEYER  2,713,397
TEST CELL
Filed April 3, 1953  4 Sheets-Sheet 4
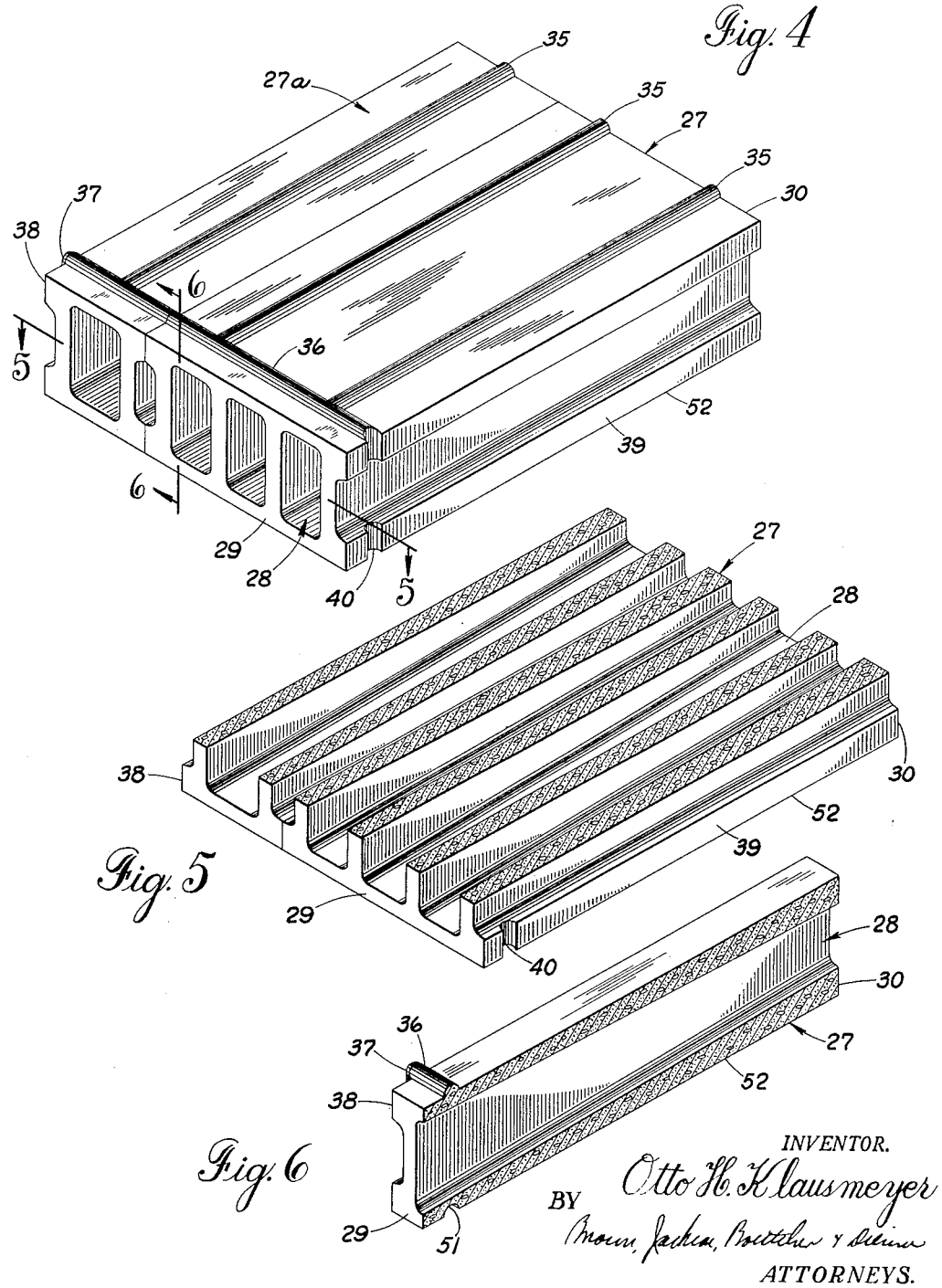
INVENTOR.
Otto H. Klausmeyer
BY
ATTORNEYS.

United States Patent Office 2,713,397
Patented July 19, 1955

2,713,397
TEST CELL

Otto H. Klausmeyer, South Bend, Ind., assignor, by mesne assignments, to Studebaker-Packard Corporation, a corporation of Michigan Application April 3, 1953, Serial No. 346,693

3 Claims. (Cl. 181—33)

My present invention relates generally to test cells for testing internal combustion engines and the like. More particularly my invention is directed to a new and improved construction for acoustical chambers having special utility in cells for testing of jet turbo engines.

In present day construction of test cells for determining the operating efficiencies and characteristics of jet turbo engines, it is a common practice to provide an acoustical chamber to absorb the sound, heat and pressures produced by the jet exhaust end of the engine. Due to the highly elevated temperatures and pressures evolved from such a jet turbo engine, such presently known acoustical chambers have proven unreliable and readily destructable. Such destruction and break down of the acoustical chambers is costly, vexatious and time consuming resulting in immense reconstruction difficulties in the reactivation of the test cell for its operation in normal industrial areas. Possibly the isolation of such test cells in remote areas might permit the elimination of muffler or acoustical chambers for absorbing the heat and shock produced by the jet engines, but removal of such test cells to remote areas is presently impractical to the manufacturer and testing engineers.

As a consequence of such difficulties in maintaining an efficient acoustical chamber or muffler for the testing of jet turbo engines and the heretofore unsolved difficulty of constructing a lasting acoustical chamber capable of withstanding the extremely high impact pressures and temperatures attendant with jet turbo engines, I have set out to provide, as herein described, a new and improved means whereby such difficulties may be successfully overcome.

Briefly the acoustical chamber of my present invention embodies a large checker work muffler capable of absorbing the sound, pressures, and temperatures accompanying the testing and running of a turbo jet engine. Coupled with such muffler is a moveable buffer wall disposed adjacent or approximate the thrust producing end of the jet engine and designed to absorb and dissipate the shock waves and pressures produced by the engine prior to their entry into the acoustical checker work muffler. Of major importance in my invention is the character of the buffer wall and its structural features whereby the same is moveable resiliently under the impact forces and pressure encountered in operation of the test cell.

The main object of my present invention is to provide a new and improved means that will withstand elevated air velocities, temperatures and pressures of the character produced by running turbo jet engines.

A further object of my present invention is to provide a new and improved construction for an acoustical chamber for jet turbo engine test cells in which a moveable shock absorbing wall is combined with an acoustical checker work muffler.

Still another object of my present invention is to provide a new and improved wall structure for utilization between a checker work muffler and the thrust producing end of a turbo jet engine which will withstand air velocities on the order of substantially 200 miles an hour, impact pressures of substantially 288 pounds per square foot and temperatures in the neighborhood of 400–500° F.

The above and further objects and features of my present invention will be recognized by those familiar with the art from the following detailed description and specifications thereof and with reference to the accompanying drawings illustrating a preferred embodiment of its features.

In the drawings:

Figure 4 is an enlarged perspective view of a shock absorbing brick construction utilized in my buffer wall;

Figure 5 is a cross-sectional view in perspective taken substantially along vantage line 5—5 of Figure 4, and showing the internal arrangement and structural features of the brick illustrated in Figure 4; and Figure 6 is a cross-sectional view in perspective taken substantially along line 6—6 of Figure 4.

Figure 1:
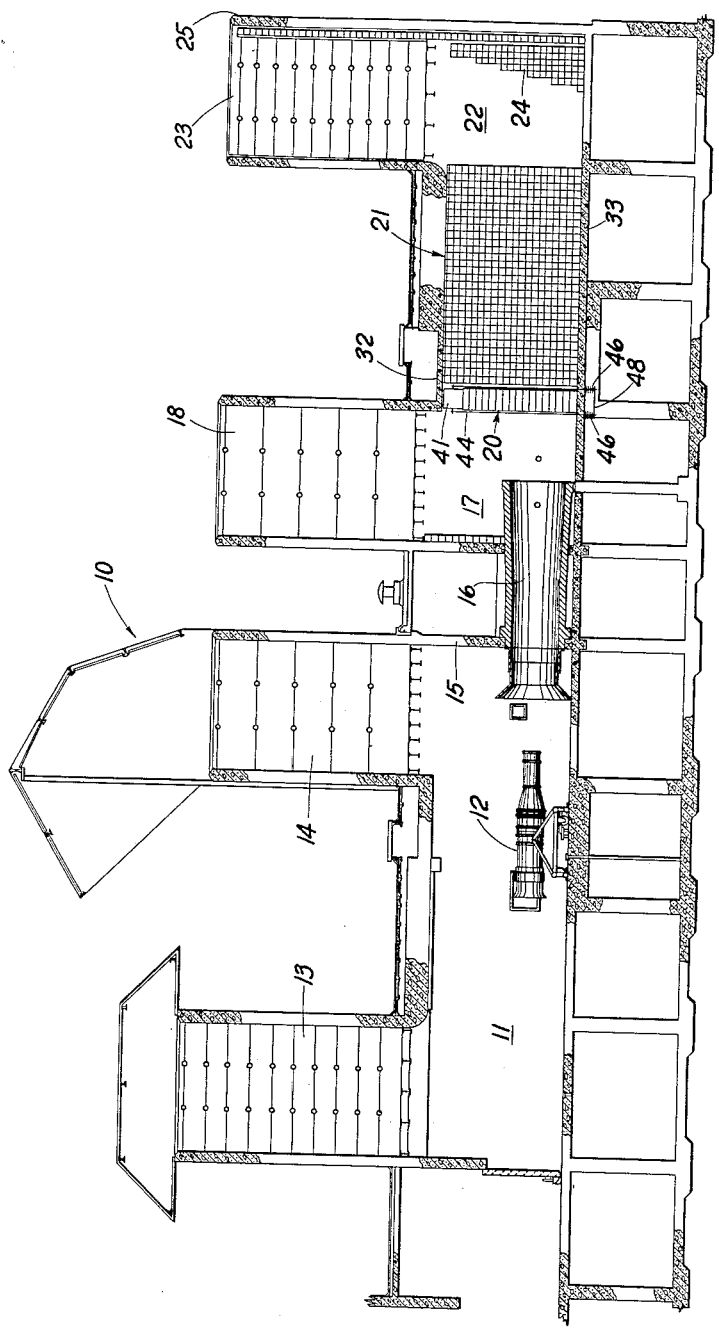
Figure 1 is a side elevational view, substantially in longitudinal cross-section with parts therein in full elevation, showing the layout and arrangement of a typical test cell embodying the features of my present invention.

Regarding particularly Figure 1 of the drawings prior to discussing the features of my present inventive concept, it will be recognized that I have therein illustrated a typical test cell 10 comprising an internal test chamber 11 of a size and nature suitable for receiving a jet turbo engine 12. The chamber 11 communicates with a pair of intake stacks 13 and 14 and terminates at a transverse rear wall section 15 through which is mounted a Venturi tube 16. The Venturi tube 16 is positioned to receive the exhaust blast of jet engine 12 and communicates with an intermediate chamber 17 of the test cell having an intake stack 18. Chamber 17 receives the exhaust from venturi 16 and is defined at its rearward side by the new and improved buffer wall 20 of my invention. Just behind the buffer wall 20 is a checker work muffler section 21 formed as a rectangular core or block. At the rearward extent of the checker work muffler 21, a third or exhaust chamber 22 is provided having an exhaust stack 23. Additionally chamber 22 has an upwardly inclined triangular shaped checker work 24 of acoustical blocks designed specifically to insulate the rearward wall 25 of the exhaust chamber 22 and direct the exhaust gases outwardly through exhaust stack 23.

From the above brief description and inspection of Figure 1, it will be recognized, by those familiar with the art, that the test cell described and shown is substantially conventional with the exception of my new and improved buffer wall and its relation and combination with the acoustical checker work muffler section 21.

In order to promote a full and clear understanding of my present invention it is best to first consider the make-up and pattern of the checker work muffler 21 with a view toward its shortcomings. This will also explain the importance and purpose of my present contribution to the art. Such an understanding and foundation in the features of the acoustical checker work muffler 21 may be best understood by referring to Figure 1 of the drawings. As will be understood from a study of Figure 1, the checker work muffler comprises an elongated section of substantial dimension formed as a rigid core from a plurality of blocks or bricks (not shown in detail). Such bricks are usually rigidly cemented together by suitable heat resistant materials. Present day practice prefers to employ in the muffler bricks or blocks made of Lumnite Haydite or silicon carbide; Lumnite being a cement and Haydite being a blast furnace slag. In any event the material utilized for the blocks must necessarily be resistant to high temperatures, elevated pressures and shock waves. As mentioned heretofore, the accepted practice is to rigidly cement the several blocks of the checker work muffler 21 in interconnected fashion thereby to form a rigid immobile core. Each of the blocks is formed with longitudinal, internal chambers, or passageways, which are aligned longitudinally of the muffler in assembly to provide for the passage of the hot gases and expulsion products produced by the turbo jet engine. It will be recognized that the provision of a checker work muffler of this type, presenting a honeycomb structure comprising a multitude of passageways therethrough, does much in the way of breaking down the noise level and dissipating the heat accompanying the running of the turbo jet engine 12.

Before my present invention, design of such test cells included only a rigid checker work muffler system as described for absorbing the shock waves, heat and pressure produced by the turbo jet engine. However, due to the fact that the several blocks which make up the checker work muffler were rigidly tied and cemented together, great difficulty was encountered in preventing the disintegration of the brick checker work under the severe operating conditions encountered. This problem will be appreciated readily when it is realized that the velocities attending the functioning of a turbo jet engine create moving air blasts having speeds up to and above 200 miles per hour giving impact pressures of approximately 288 pounds per square foot and accompanied by temperatures ranging from 400 to 500° F.

Be that as it may, it is sufficient for present purposes to state that checker work muffler systems now employed in test cells of the character described comprise rigid perforated mufflers which due to their rigidity are not capable of withstanding, for sustained periods, extremely high temperatures, pressures and air velocities accompanying the exhaust blast of a running turbo jet engine. It will be understood and appreciated that breakdown of the check work muffler system results in a breakdown in the entire test cell. Because of the vast number of blocks involved in the make-up of the checker work muffler 21, its repair and replacement is tedious, expensive and time consuming.

In order to overcome the above mentioned difficulties, I have devised my new and improved shock absorbing wall 20, herein termed a "buffer wall," which is placed intermediate the rigid checker work acoustical muffler 21 and the discharge end of the venturi tube 16 in a test cell. The features of my buffer wall are such as to absorb the initial shock waves emitting from the venturi and break up the rapidly moving air and exhaust gases to a degree whereby the rigid acoustical checker work muffler can withstand their effects for sustained periods.

Figure 2:
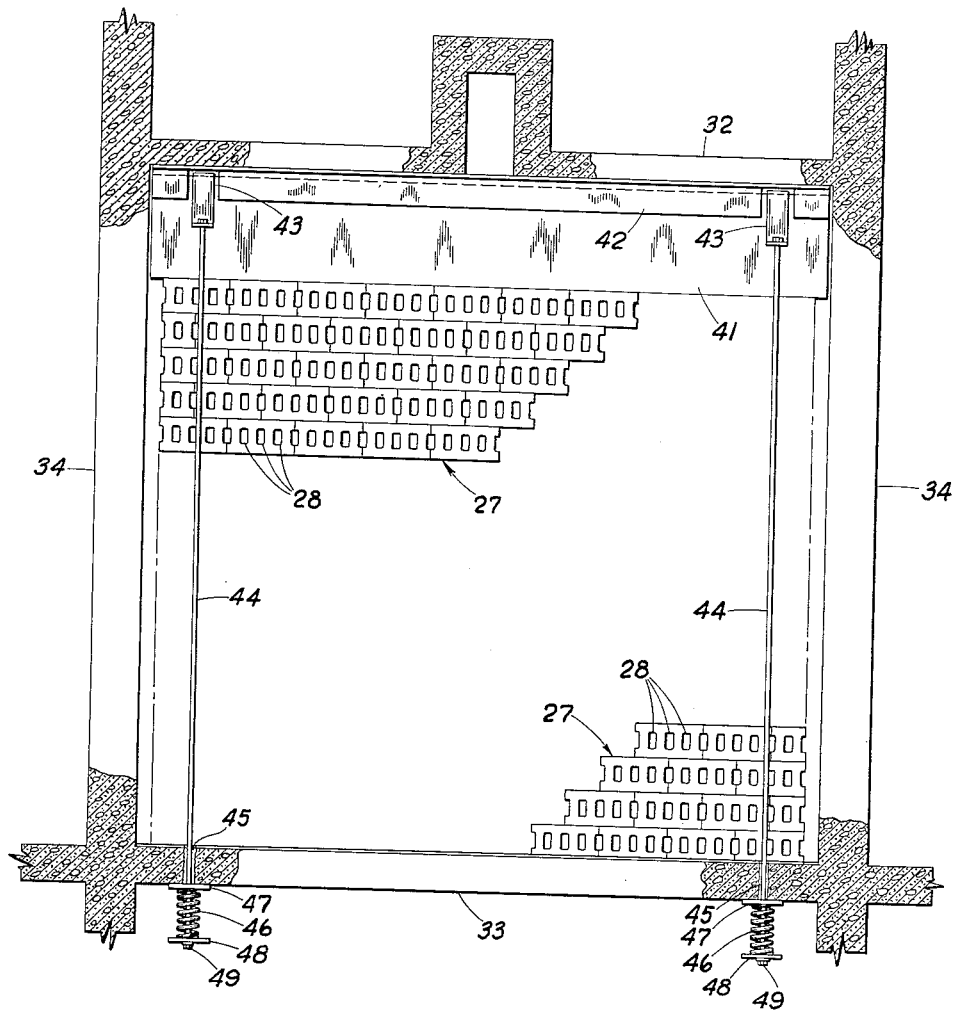
Figure 2 is an enlarged partial front elevational view of the buffer wall of my present invention.
Figure 3:
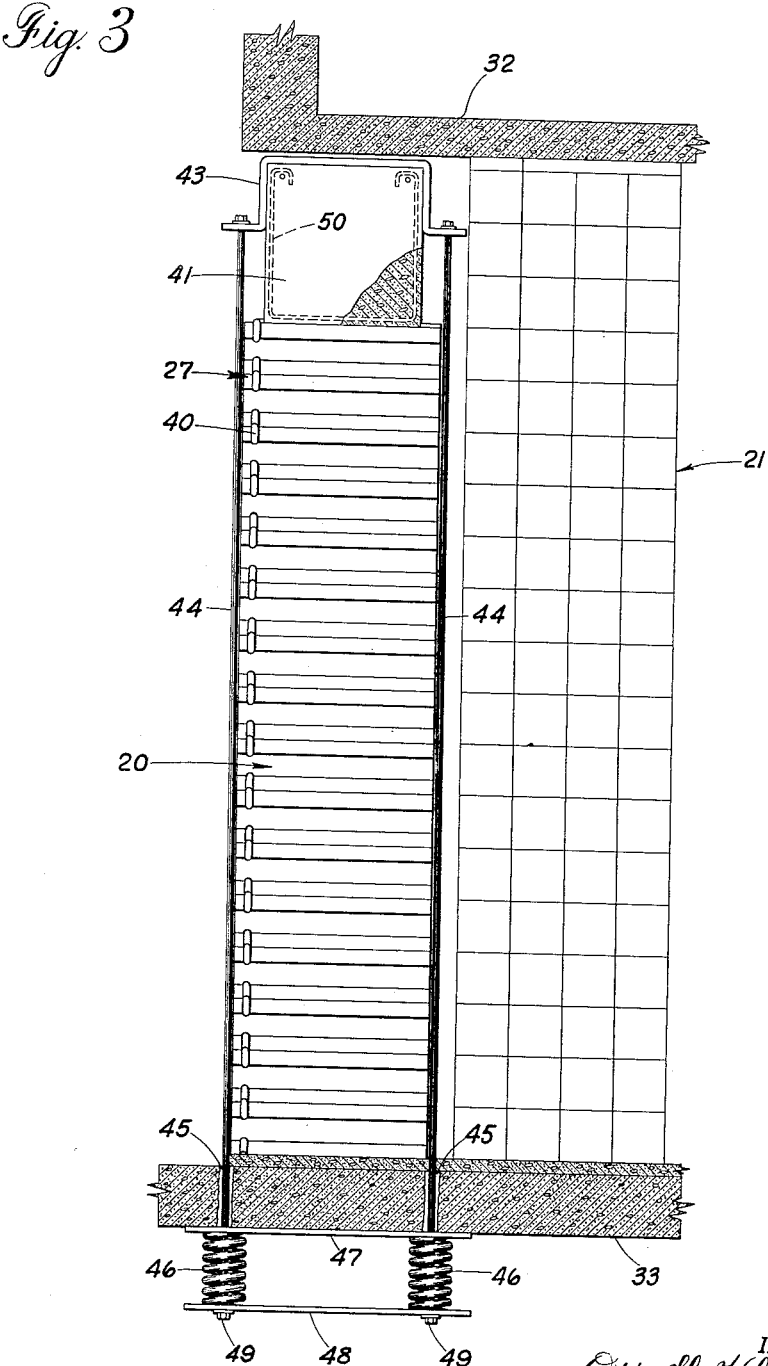
Figure 3 is an end elevational view of the buffer wall illustrated in Figure 2.

In order to best understand the features of my buffer wall which make the above named results possible, reference is made to the illustration thereof in Figures 2 and 3 of the drawings. From Figure 2 it will be recognized that the top, bottom and two side walls of the cell proper, 32, 33 and 34, 34 respectively, which bound the checker muffler 21 enclose a substantially square cross-sectional area. Across the mouth of the checker work chamber and between the checker work muffler and the discharge end of the venturi 16, I mount my new and improved buffer wall assembly 20 comprising in the main a plurality of interlocked blocks 27 of the character illustrated in Figures 4 through 6 of the drawings. Each of the blocks 27 is formed with longitudinal, internal chambers or passageways 28 as will be appreciated from a study of Figures 4, 5 and 6. The chambers 28 of the blocks 27 are each preferably formed with an elongated taper having a reduced cross-section as it progresses from the front face 29 of the block to the rearward face 30 thereof, thus providing a multitude of converging throats. Such chambers 28 are thus designed to throttle and retard the rapidly moving air produced by the exhaust of the jet engine. The blocks 27 preferably are formed of a heat resistant material such as Lumnite-Haydite silicon carbide or like materials. No cement or mastic is used intermediate the several blocks 27 utilized in my buffer wall, but interjoining thereof relies solely on the interlocking arrangement of a projecting bead and groove system associated with the blocks. In greater particular, each block 27 is provided along its upper face with two longitudinally extending beaded projections 35 intersected adjacent the forward edge 29 of the block by a transversely related bead projection 36. Bead projection 36 also runs transversely downward at 37 across one side edge 38 of the block. The opposite side edge 39 of the block bears groove 40 for receiving the projection portion 37 of an adjacent block. In a similar manner, mating grooves 51 adapted for the reception of the projections 35 and 36 of an adjacent block are formed in the under surface 52 of the block. With this bead and groove system the several blocks 27, and half portions thereof as indicated at 27a in Figure 4, may be accurately united. Having assembled the several block elements to form a pervious brick wall, as best seen in Figures 2 and 3, means for movably tying the wall in place are necessary. To this end I employ a concrete beam 41 across the upper end of the buffer wall and extending between side walls 34, 34 of the cell's checker chamber. A metal cap 42 of channel construction is placed invertedly over the concrete beam lengthwise and two horseshoe shaped straps 43, 43 are mounted rigidly therewith adjacent each end of the beam member 41. Pairs of tie rods 44, 44 are associated with each of the strap members 43, there being one such tie rod vertically disposed and related to each arm of each of the horseshoe strap members 43. The tie rods 44 are led downwardly along each face of the buffer wall and pass through suitable openings 45, preferably packed with asbestos rope (not shown), formed in the floor wall 33 of the checker chamber. Compression spring members 46, 46 are fitted concentrically about the lower end of each of the tie rods and bearing plates 47 are disposed between the upper end of the springs and the underface of floor 33. Note that plates 47 interconnect the two tie rods related to each of the horseshoe shaped straps 43. Additional tie plates 48 are likewise placed between the lower ends of the tie rods beneath springs 46. Nut means 49 are then utilized to rigidly tie the bearing plates and springs to the tie rods with the upper bearing plates 47 resting adjacently against the under side of the floor 33 of the checker chamber. For greater strength the concrete beam 41 is reinforced with stirrup members 50, as best seen in Figure 3 of the drawings. It will further be noted that the buffer wall construction thus described is disposed in lateral spaced relation from the leading edge of the checker work muffler system 21. This spacing permits restricted rocking action of the buffer wall about its lower end under thrust of the turbo jet's exhaust; the coil springs 46 serving to resiliently resist such movement of the buffer wall.

Since the several blocks of the buffer wall are interlocked by the described bead and groove members and are tied down to the floor of the test cell, by the concrete beam, tie rods, and compression springs as described, permissible movement of the buffer wall under the impact of the high exhaust velocities and pressures is readily attained. This means that instead of having a rigid muffler checker work to absorb the initial exhaust impact, a moveable buffer wall is provided intermediate the checker work and the source of the highly moving exhaust gases spilling from the venturi 16. The spring members 46, of course, serve to accommodate such resilient or cushioning movement of the buffer wall in operation of the test cell thereby giving rise to a floating wall capable of withstanding the high pressures and velocities and shock waves exhausting from the venturi. Additionally the internal channels 28 of the several block elements of my buffer wall serve to effectively dissipate and break up the rapidly moving exhaust gases prior to their entry into the rigid checker work of the muffler. With this combination of a moveable or yielding buffer wall and the rigid muffler checker work the life and endurance of the muffler is much more lasting, permitting sustained operation of the test cell.

Thus it may be seen that I have herein described and illustrated a new and improved construction for use in test cells and having particular utility in the testing of jet turbo engines. Its successful application will be apparent, with my resilient buffer wall giving rise to a satisfactory solution to the problems heretofore encountered in this art and as described hereinabove. Nevertheless, while I have herein described and shown a preferred embodiment of my teachings, it will be appreciated that numerous changes, modifications and substitutions of equivalents may be resorted to therein without departing from its spirit and scope. As a consequence I do not wish to be limited to the particular form of my invention herein illustrated and described except as may appear in the following appended claims.

I claim:

1. For use in a test cell for testing turbo jet engines and the like, an improved means for absorbing the shock waves, pressures and temperatures present in the exhaust stream from a jet engine, comprising, a rigid immobile muffler core blocking off the exhaust through the test cell and formed as a checker work of elongated passageways aligned with the flow of exhaust gases from the engine, and a movable buffer wall disposed between said muffler core and the exhaust end of the engine, said buffer wall being constructed of interlocked thermal resistant blocks having passageways aligned with the flow of exhaust gases from the engine, each of said passageways in said blocks converging in the direction of said muffler core, and means resiliently anchoring said buffer wall to said cell in a manner permitting its pivotal movement under the impact of exhaust products from the engine.

2. For use in a test cell for testing turbo jet engines and the like, an improved means for absorbing energy and noises of the exhaust products of an engine, comprising, an immobile muffler checker work having passageways therethrough, said passageways serving to dissipate and absorb the energy and noise of the exhaust products emitting from the engine, a buffer wall disposed transversely of the exhaust passageway of the test cell and intermediate the exhaust end of the engine and the forward end of said muffler, said buffer wall being constructed and arranged to absorb the initial shock of the flowing exhaust products of the engine, and means for mounting said wall for resilient pivotal movement about its lower end.

3. The means of claim 2 in which said buffer wall comprises a plurality of loosely interlocked block members having converging passageways aligned with the flow of engine exhaust products, strap means tying said blocks to the one wall of said test cell, and spring means located beneath said wall and resiliently connected with said strap means in a manner accommodating pivoting of said wall about its lower end.

References Cited in the file of this patent

UNITED STATES PATENTS 2,519,161     Tucker _____ Aug. 15, 1950

FOREIGN PATENTS 1,000,169     France _____ Oct. 10, 1951

OTHER REFERENCES

Article by Fehr et al., The Journal of the Acoustical Society of America, vol. 24, No. 5, pages 480–489, 1952.